(12) United States Patent
Lee

(10) Patent No.: US 6,169,661 B1
(45) Date of Patent: Jan. 2, 2001

(54) COMPUTER SPARE POWER SUPPLY STRUCTURE

(76) Inventor: Kenny Lee, 10F, No. 18, Lane 609, Sec.5, Chung Hsin Road, San Chung City, Taipei Hsien (TW)

(*) Notice: Under 35 U.S.C. 154(b), the term of this patent shall be extended for 0 days.

(21) Appl. No.: 09/283,321

(22) Filed: Mar. 31, 1999

(51) Int. Cl.[7] .................................................... H05K 7/20
(52) U.S. Cl. ........................ 361/752; 361/753; 361/796; 307/150
(58) Field of Search .................................. 361/752, 796, 361/680, 685, 766, 767, 775; 307/150

(56) References Cited

U.S. PATENT DOCUMENTS 4,122,508 * 10/1978 Rumbaugh ............................ 361/811
5,121,296 * 6/1992 Hsu ....................................... 361/825
6,002,586 * 12/1999 Chen et al. ........................... 361/695

* cited by examiner

Primary Examiner—Leo P. Picard
Assistant Examiner—Hung Van Duong
(74) Attorney, Agent, or Firm—Dougherty & Troxell

(57) ABSTRACT

A computer spare power supply structure includes a power supply and a casing. One corner of the casing is provided with a retaining threaded seat. One corner edge of the power supply is provided with a longitudinal recess that can circumvent the retaining threaded seat when being inserted into the casing, thereby achieving optimum use of the unit usable space of the power supply and ensuring that the power supply appears nice and even on a front face of the casing.

1 Claim, 5 Drawing Sheets

COMPUTER SPARE POWER SUPPLY STRUCTURE

BACKGROUND OF THE INVENTION (a) Field of the Invention

The present invention relates to a spare power supply structure for computers, more particularly to a spare power supply structure that enables optimum use of the unit usable space of the power supply while ensuring that the power supply appears nice and even on a front face of a casing.

(b) Description of the Prior Art

In general, computers are provided with power supplies to supply them with the necessary direct currents. Usually, a computer has only a single power supply. However, if the power supply cannot function during operation of the computer so that it cannot supply the computer with electric power, computer system failure or loss of files may result. Manufacturers have therefore developed a spare power supply device to provide the necessary electric power when the main power supply fails. The principle adopted is substantially the same as the juxtaposition of hard disks in a computer. Such spare power supplies are quite popular now.

As mentioned above, the power supplies in a computer are connected in juxtaposition. Both power supplies are disposed in the same casing. When one of them fails, the other one will continue to supply power to the computer to prevent system failure or loss of files, as shown in FIG. 1.

Conventional spare power supplies are configured to be removable like a drawer so that it is not necessary to shut down the computer during on-line operation failure and supply of power will not be interrupted. However, in order to positively secure each power supply 1, manufacturers have to choose between appearance and use of space in the installation of conventional spare power supplies. Referring to FIG. 4, in order to ensure that the front face of the spare power supply 1 appears to flush with the front face of a casing 2, one side of the power supply 1 is recessed to leave a space to circumvent a screw positioning seat 21 on the casing 2 and to enable the power supply 1 to slide along a slide track means into the casing 2. Screws are then used to secure the power supply 1 inside the casing 2. Although the power supply 1 in the casing 2 appears flat and even, the unit usable space of the power supply 1 is relatively reduced. Referring to FIG. 5, in order to make the best use of the unit usable space of the power supply 1, the power supply 1 has to be provided with an extension securing plate 11 extending from one side of its front face. This will sacrifice the appearance of the power supply 1 in the casing 2.

It is therefore desirable to have a spare power supply that can eliminate the above-mentioned problems of the prior art.

SUMMARY OF THE INVENTION

A primary object of the present invention is to provide a computer spare power supply structure that enables optimum use of the unit usable space of a power supply while ensuring that the power supply appears nice and even on a front face of a casing.

According to the present invention, the computer spare power supply structure includes a power supply and a casing. One corner of the casing is provided with a retaining threaded seat. One corner edge of the power supply is provided with a longitudinal recess that can circumvent the retaining threaded seat when being inserted into the casing.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
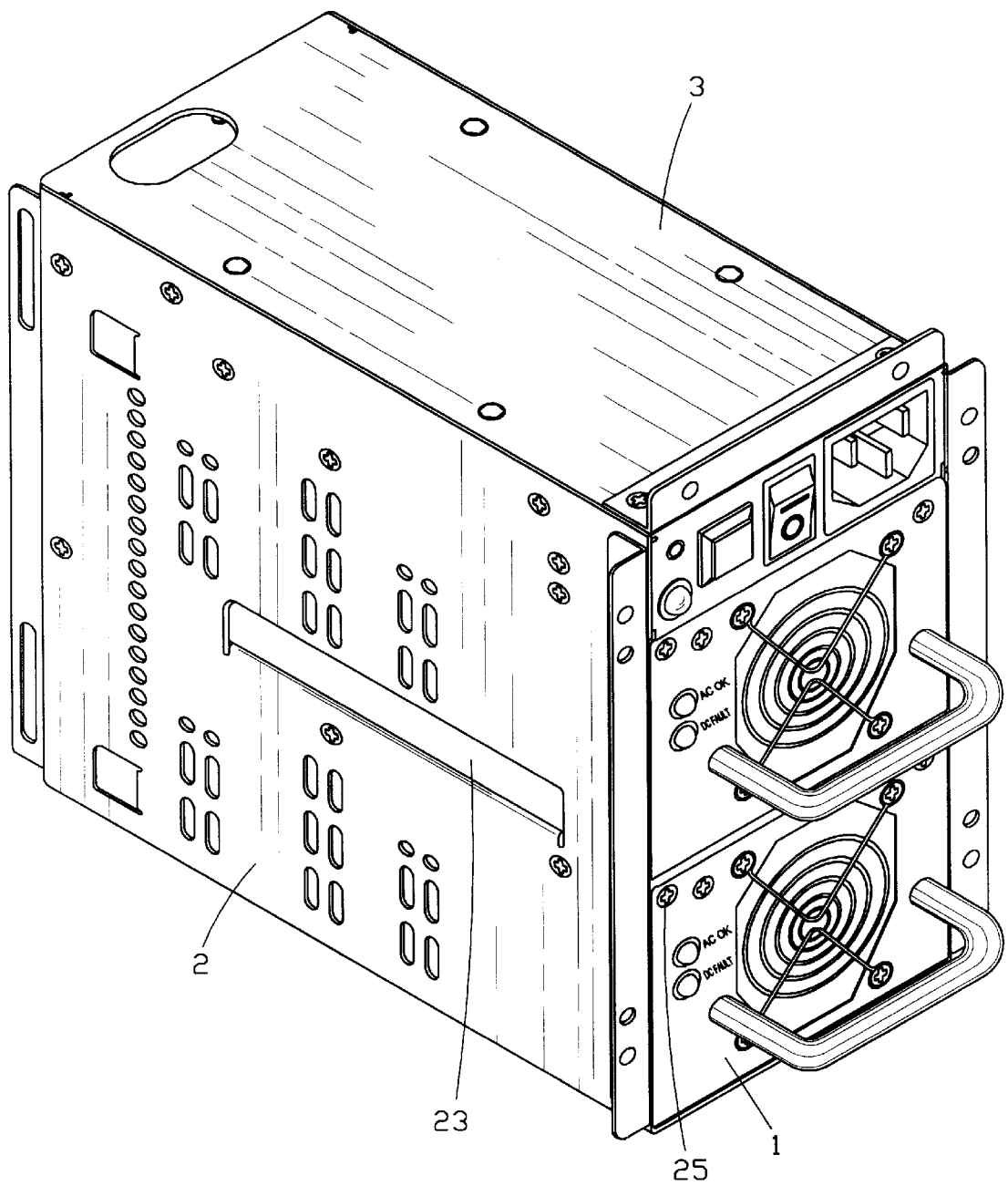
FIG. 1 is a perspective view of the present invention.
Figure 2:
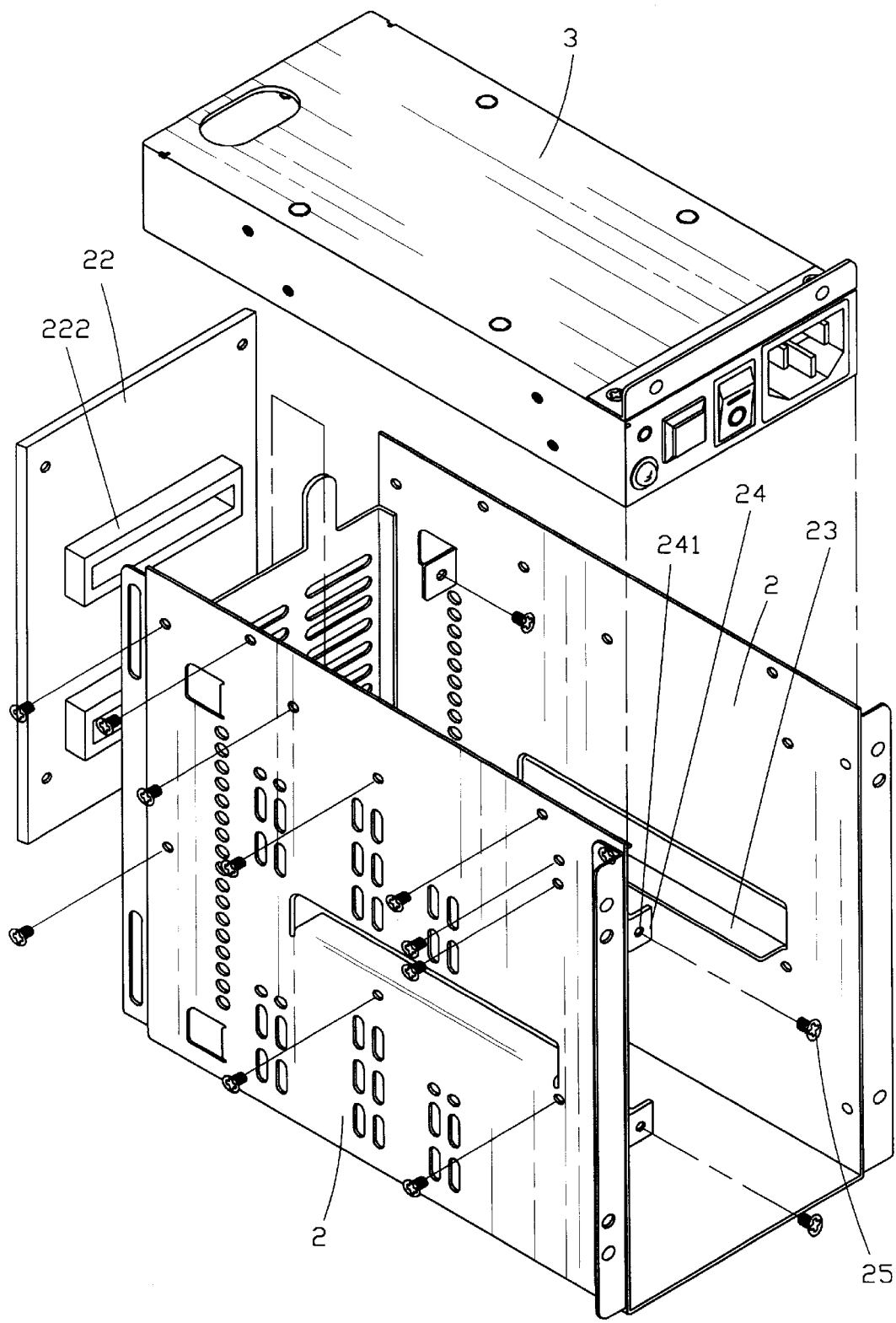
FIG. 2 is an exploded perspective view of the present invention.
Figure 3:
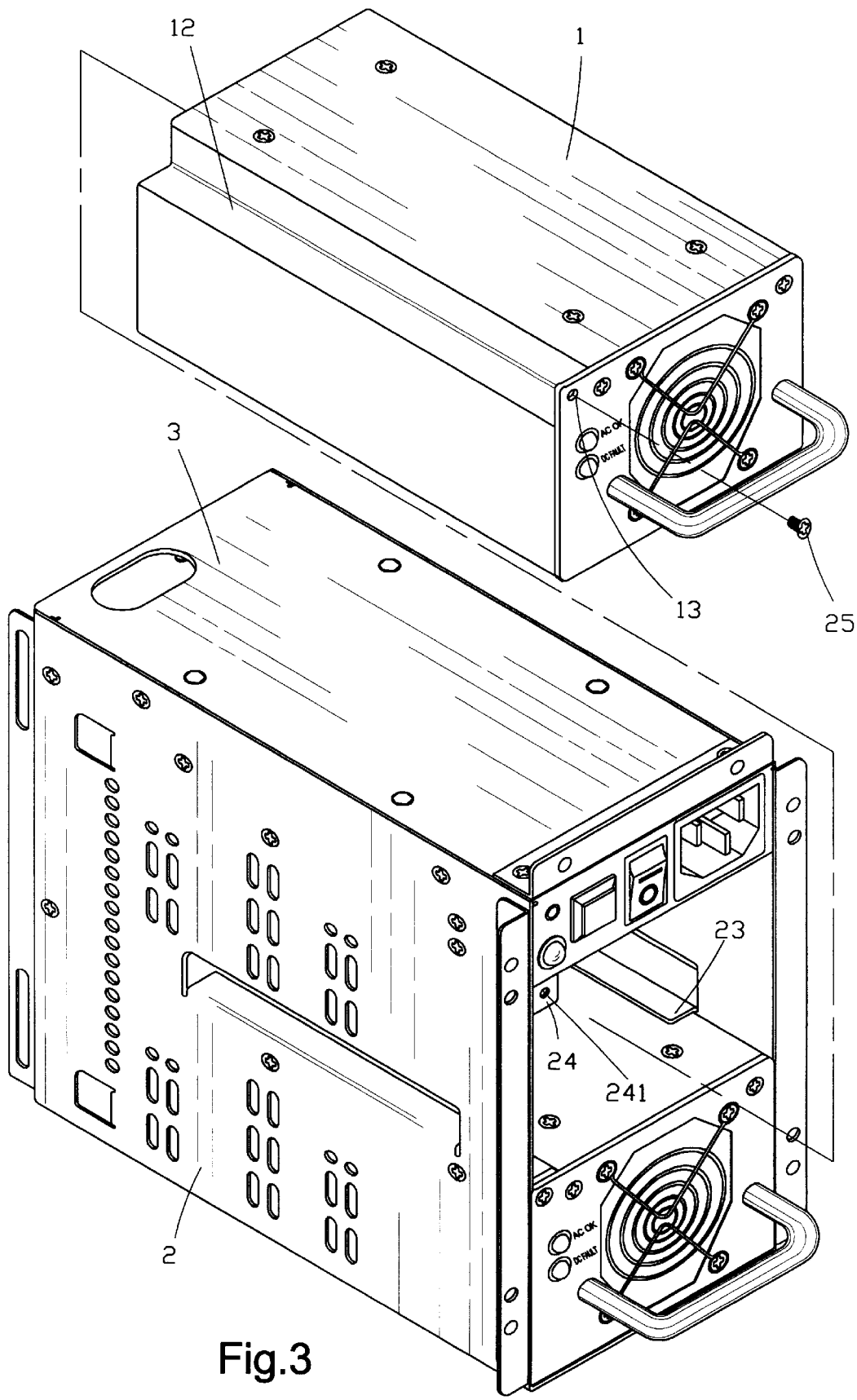
FIG. 3 is a partly exploded perspective view of the present invention.
Figure 4:
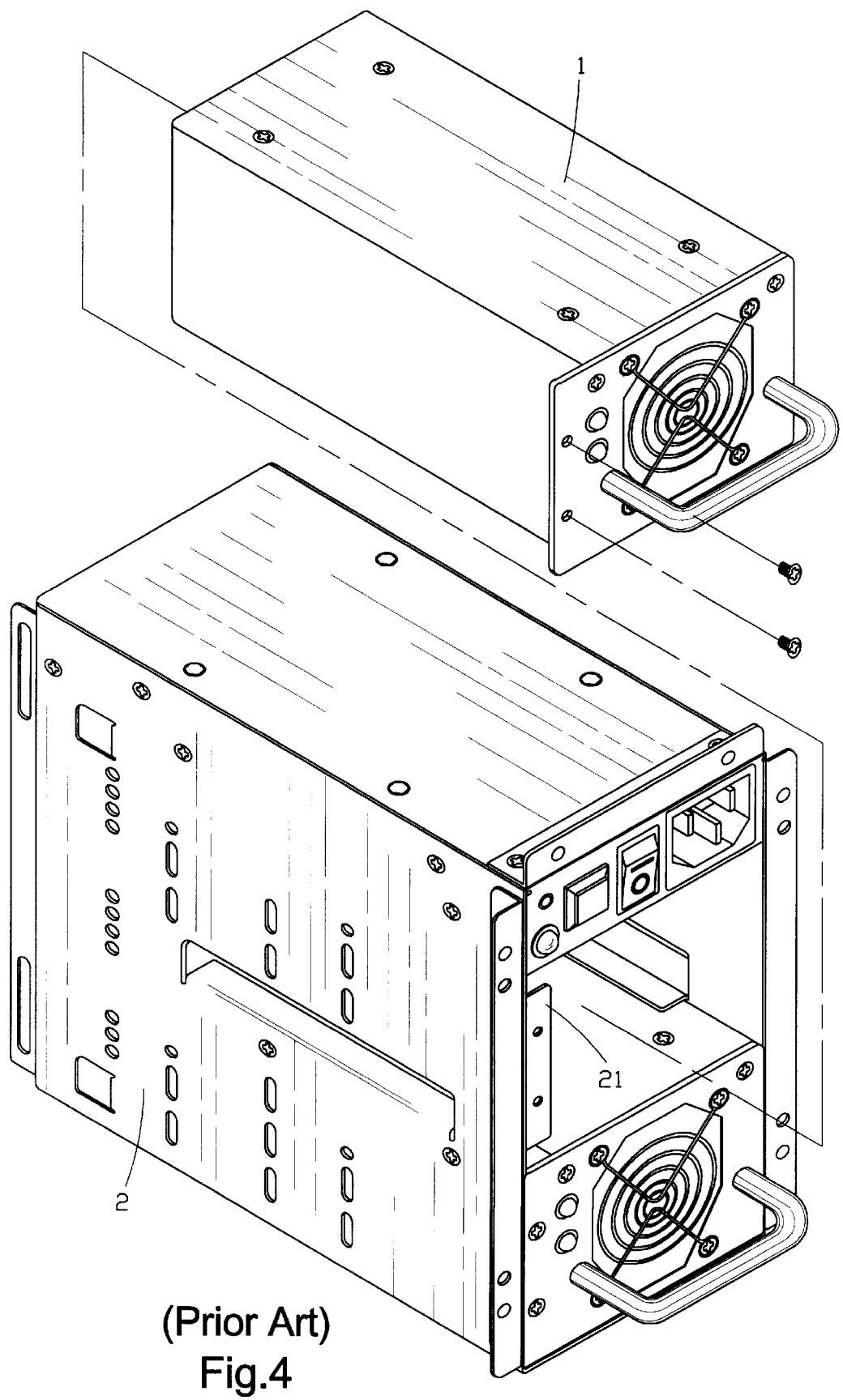
FIG. 4 is a perspective exploded view illustrating assembly of a conventional spare power supply of the prior art.
Figure 5:
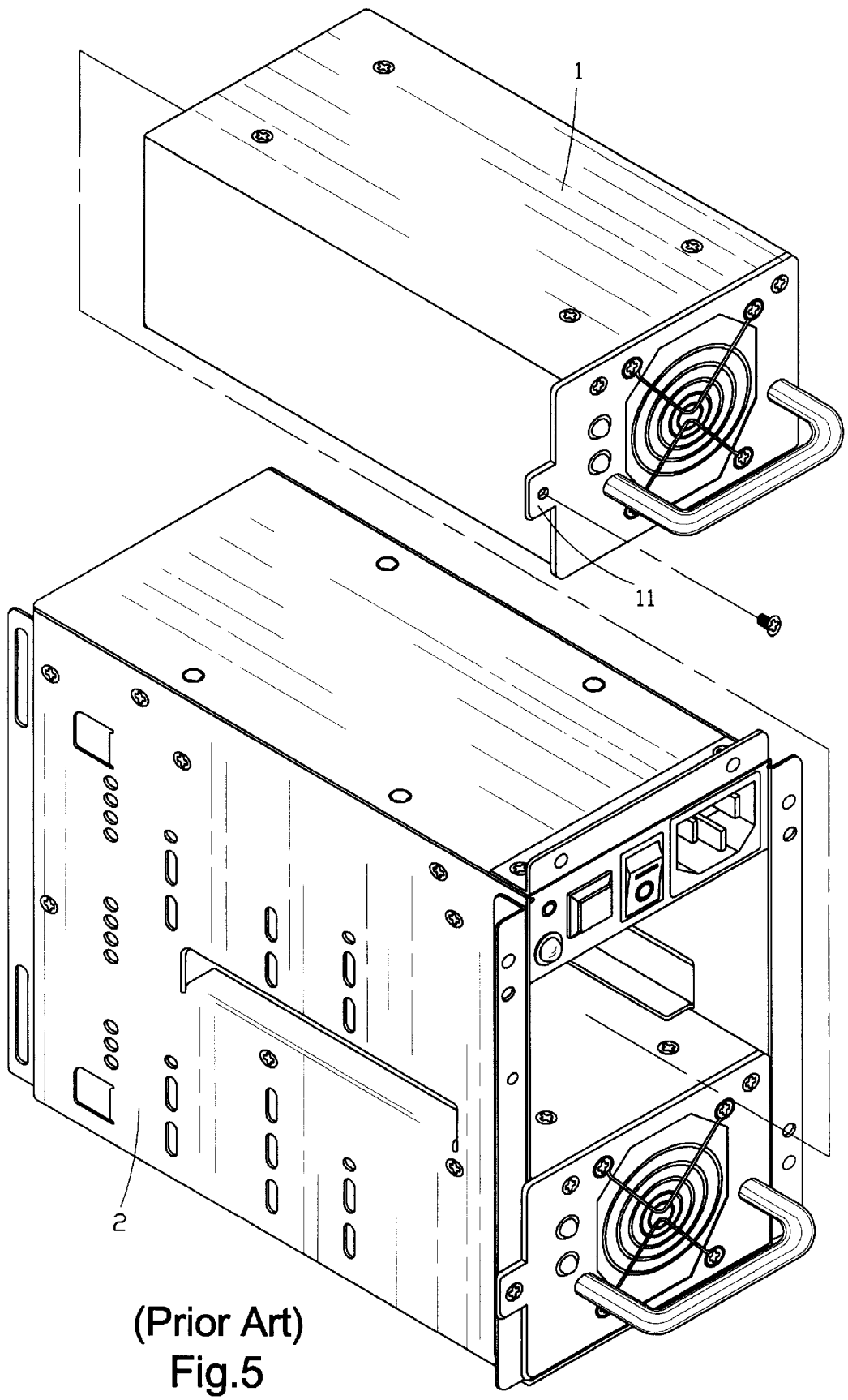
FIG. 5 is a perspective exploded view of another conventional spare power supply of the prior art.

As shown in FIGS. 1, 2 and 3, the present invention essentially comprises a power supply 1 and a casing 2. An upper end of the casing 2 is provided with a switch element box 3. A rear end of the casing 2 is provided with a circuit board 22 having terminal seats 222 disposed thereon. Opposed lateral side walls of the casing 2 are provided with inwardly extending slide tracks 23 at an intermediate portion thereof so that they form upper and lower independent slide tracks. A retaining threaded seat 24 is provided at one corner of the slide track 23. The retaining threaded seat 24 is provided with a threaded hole 241. One corner edge of the power supply 1 is configured to have a longitudinal recess 12 so as to circumvent the retaining threaded seat 24. That portion of the front face of the power supply 1 corresponding to the recess 12 is provided with a through hole 13. By virtue of the structure of the present invention, the power supply 1 can be slid along the slide tracks 23 or the bottom portion of the casing 2 into the casing 2 such that the recess 12 can circumvent the retaining threaded seat 24 at one corner of the slide track 23 of the casing 2, and terminals at a rear end of the power supply 1 can be retained after engaging the terminal seats 222 of the circuit board 22. A screw 25 can then pass through the threaded hole 241 of the retaining threaded seat 24 to secure the power supply 1 in position.

In summary, the present invention allows for an optimum use of the unit usable space of the power supply 1 while ensuring that the power supply appears nice and even on the outer face of the casing 2.

Although the present invention has been illustrated and described with reference to the preferred embodiment thereof, it should be understood that it is in no way limited to the details of such embodiment but is capable of numerous modifications within the scope of the appended claims.

What is claimed is:

1. A computer spare power supply structure, comprising a power supply and a casing, an upper end of said casing being provided with a switch element box, a rear end of said casing being provided with a circuit board having a terminal seat disposed therein, inwardly extending slide tracks being provided on opposed lateral side walls of said casing at an intermediate portion such that they form upper and lower independent slide tracks, wherein one corner of each of said slide track is provided with a retaining threaded seat, said retaining threaded seat being provided with a threaded hole, one corner edge of said power supply being formed with a longitudinal recess at a position corresponding to a respective one of said retaining threaded seat so as to circumvent said retaining threaded seat during installation, said power supply further having a front face that is provided with a through hole at a position corresponding to said recess, whereby said power supply is slid along said slide tracks or a bottom portion of said casing into said casing such that said recess can circumvent said retaining threaded seat at one corner of a respective one of said slide tracks, and terminals at a rear end of said power supply can be retained in said terminal seat after coupling therewith, a screw passing through said through hole in said front face of said power supply into said threaded hole of said retaining screw seat to lock said power supply in position, thereby achieving optimum use of unit usable space of said power supply and ensuring that said power supply appears nice and even on a front face of said casing.

* * * * *